(12) United States Patent
Kimura et al.

(10) Patent No.: US 8,979,137 B2
(45) Date of Patent: Mar. 17, 2015

(54) COUPLING RING

(75) Inventors: Miyoshi Kimura, Isesaki (JP); Tatsuya Hayashi, Kyoto (JP); Yuji Yamaguchi, Kyoto (JP); Toshiyuki Himi, Kyoto (JP); Kazuhiro Oya, Kyoto (JP)

(73) Assignees: Ihara Science Corporation, Tokyo (JP); Horiba Stec, Co., Ltd., Kyoto-shi (JP)

( * ) Notice: Subject to any disclaimer, the term of this patent is extended or adjusted under 35 U.S.C. 154(b) by 414 days.

(21) Appl. No.: 12/957,270

(22) Filed: Nov. 30, 2010

(65) Prior Publication Data
US 2011/0127770 A1 Jun. 2, 2011

(30) Foreign Application Priority Data

Nov. 30, 2009 (JP) ................................. 2009-272735
Nov. 30, 2009 (JP) ................................. 2009-272736
Nov. 30, 2009 (JP) ................................. 2009-272737

(51) Int. Cl.
*F16L 23/00* (2006.01)
*F16L 23/10* (2006.01)
*F16L 23/18* (2006.01)

(52) U.S. Cl.
CPC *F16L 23/10* (2013.01); *F16L 23/18* (2013.01)
USPC .......................................... 285/367; 285/411

(58) Field of Classification Search
CPC ........... F16L 23/08; F16L 23/10; F16L 23/04; F16L 23/06
USPC .................. 285/364, 406, 420, 367, 411, 410
See application file for complete search history.

(56) References Cited

U.S. PATENT DOCUMENTS

| 3,830,533 | A | * | 8/1974 | Mezei et al. | 285/364 |
| 4,568,115 | A | * | 2/1986 | Zimmerly | 285/411 |
| 4,702,499 | A | * | 10/1987 | deRaymond et al. | 285/367 |
| 4,915,418 | A | * | 4/1990 | Palatchy | 285/367 |

(Continued)

FOREIGN PATENT DOCUMENTS

| JP | 6139187 Y2 | 11/1986 |
| JP | 01255783 A | 10/1989 |

(Continued)

OTHER PUBLICATIONS

Japanese Patent Office, Decision of Refusal of Japanese Patent Application No. 2009-272737, Jan. 28, 2014, 3 pages.

(Continued)

*Primary Examiner* — David E Bochna
(74) *Attorney, Agent, or Firm* — Alleman Hall McCoy Russell & Tuttle LLP

(57) ABSTRACT

A coupling ring is provided, including a series of unit members with adjacent unit members rotatably coupled to each other, and a fastener coupling unit members on both ends to each other. A concave groove provided to extend circumferentially is externally fitted into an outer circumference of each of two opposing flanges. The unit members on the both ends are coupled to each other by the fastener to be turned into an annular state. The fastener is fastened to thereby press an inclined surface. The flanges are pressure-bonded to each other by forces generated during pressing. A stopper member is provided to restrict a separation angle between the unit member on one end and an adjacent unit member to fall within a certain angle in an open state in which the unit members on the both ends are not coupled to each other provided on at least one of the unit members.

3 Claims, 17 Drawing Sheets

(56) References Cited

U.S. PATENT DOCUMENTS

| | | | |
|---|---|---|---|
| 5,018,768 A * | 5/1991 | Palatchy | 285/367 |
| 6,030,006 A * | 2/2000 | Lin | 285/411 |
| 6,056,332 A * | 5/2000 | Foster | 285/367 |
| 6,536,811 B1 * | 3/2003 | Ranson et al. | 285/364 |
| 6,896,301 B2 * | 5/2005 | Brice | 285/364 |
| 8,220,113 B2 * | 7/2012 | Morton et al. | 285/411 |
| 2006/0049634 A1 * | 3/2006 | Goodsel et al. | 285/406 |
| 2009/0096210 A1 * | 4/2009 | Maunder | 285/411 |
| 2011/0127770 A1 * | 6/2011 | Kimura et al. | 285/367 |
| 2012/0256418 A1 * | 10/2012 | Horgan | 285/420 |

FOREIGN PATENT DOCUMENTS

| | | |
|---|---|---|
| JP | 027726 U | 1/1990 |
| JP | 02066390 A | 3/1990 |
| JP | 04249692 A | 9/1992 |
| JP | 05172265 A | 7/1993 |
| JP | 06035778 U | 5/1994 |
| JP | 653891 U | 7/1994 |
| JP | 06257690 A | 9/1994 |
| JP | 08334190 A | 12/1996 |
| JP | 11002384 A | 1/1999 |
| JP | 11230487 A | 8/1999 |
| JP | 2001355772 A | 12/2001 |
| JP | 2004015673 A | 1/2004 |
| JP | 3113415 U | 7/2005 |
| JP | 2007529766 A | 10/2007 |
| JP | 2008025615 A | 2/2008 |
| JP | 2008-286325 A | 11/2008 |
| JP | 2008286259 A | 11/2008 |
| WO | 2005091053 A1 | 9/2005 |

OTHER PUBLICATIONS

Japanese Patent Office, Office Action of Japanese Patent Application No. 2009-272735, Jan. 28, 2014, 3 pages.

Japanese Patent Office, Appeal Decision of Refusal of Japanese Patent Application No. 2009-272736, Nov. 11, 2014, 13 pages.

* cited by examiner

COUPLING RING

TECHNICAL FIELD

The present invention relates to a coupling ring for opposing and coupling flanges to each other and particularly relates to a technique for suitably coupling pipes having flanges in series. The present invention also relates to a positioning ring holding a pair of pipes while making central axes of the pipes coincident with each other. The present invention further relates to an inclined ring used to pressure-bond flanges opposing each other.

BACKGROUND ART

Various pipe coupling methods have been recently developed. As one of the methods, there is known a method of coupling a pair of pipes each having a disk flange to each other using a coupling ring as disclosed in Japanese Published Patent Application No. 2008-286325A. This coupling ring includes a series of unit members configured so that which adjacent members are rotatably coupled, and couples the flanges to each other by connecting the unit members on both ends using a fastener.

SUMMARY OF THE INVENTION

Technical Problem

At the time of coupling, one end of the coupling ring in an open state is inserted downward into the pipes from one side of the pipes with the flanges opposing and closely connected to each other, and the inserted end of the coupling ring is pulled up from the other side of the pipes and fastened to the other end of the coupling ring.

However, one end of the coupling ring inserted downward into the pipes is suspended due to gravity since the adjacent unit members of the coupling ring are rotatably connected. Particularly in a narrow working space, it is often disadvantageously difficult to insert one end of the coupling ring downward into the pipes or to pull up the end.

The present invention has been achieved to solve the above-stated problem. It is, therefore, a main object of the present invention to provide a coupling ring capable of easily coupling flanges even in a small working space.

Solution to the Problem

Accordingly, a coupling ring according to one aspect of the present invention includes: a series of unit members configured so that unit members adjacent to each other are rotatably coupled to each other; and a fastener coupling unit members on both ends to each other, wherein a concave groove is provided in each of the unit members to extend circumferentially. Further, the concave groove is externally fitted into an outer circumference of each of two opposing flanges, the unit members on the both ends are coupled to each other by the fastener to be turned into an annular state, the fastener is fastened to thereby press an inclined surface formed on a side surface of the concave groove and inclined surfaces formed on rear surfaces of the respective flanges, and the flanges are pressure-bonded to each other by components of force generated at a time of pressing. A stopper member to restrict a separation angle between a unit member on one end and an adjacent unit member to fall within a certain angle in an open state in which the unit members on the both ends are not coupled to each other by the fastener is provided on at least one of the unit members.

It is preferable that the stopper member protrudes from either of a unit member on one end or an adjacent unit member, and abuts the unit member on the other end when the separation angle is equal to the certain angle. If the stopper member is configured as stated above, it is possible to restrict a rotational angle without making the coupling ring complex.

It is preferable that the certain angle is equal to or smaller than 180 degrees since this can facilitate pulling up one end.

It is preferable that the series of unit members includes three unit members, and that the stopper member restricts a separation angle of each of the unit members on both ends with respect to an intermediate unit member located at intermediate the unit members on both ends.

A fluid supply device using such a coupling ring can be made compact and easily attach or detach pipes.

The conventional technique also has the following problem. A so-called flange joint is intended to connect pipes by connecting flanges provided on ends of the respective pipes. At the time of connection, it is necessary to make central axes of the opposing flanges (pipes) coincident with each other. To this end, a cylindrical positioning ring, for example, is used (see Japanese Published Patent Application No. 2008-286325A).

This positioning ring makes the central axes of these pipes coincident with each other by causing one end and the other end of the positioning ring to be externally fitted into one of the pipes (or flanges) and the other pipe (or flange) without backlash, respectively.

However, with this configuration, it is necessary to move the pipes relatively to the positioning ring in an axial direction when the positioning ring is detached or attached. It is often disadvantageously difficult to detach or attach the positioning ring if many pipes are connected horizontally and vertically such as seen in a gas panel and the pipes are difficult to move in the axial direction.

Particularly at the time of detachment, the problem is conspicuous since the pipes are in an assembled state and the other regions are often fixed and immovable.

The present invention has been achieved to solve the above-stated problem. It is, therefore, a main object of the present invention to provide a positioning ring capable of being easily and detachably attached.

Accordingly, a positioning ring according to another aspect of the present invention is a positioning ring in a form of a pipe having a predetermined length axially, having one end externally fitted into one pipe and other end externally fitted into another pipe, and holding the pipes while making central axes of the pipes substantially coincident with each other, wherein notches penetrating through a thickness direction of a wall forming the positioning ring are provided in one end and the other end, respectively.

It is preferable that a central angle of each of the notches viewed from an axial direction is set to be smaller than 180 degrees so as to ensure making central axes of the flanges coincident with each other.

It is preferable that the notch on one end and the notch on the other end are continuous. If the notches are continuous, the positioning ring can be easily attached or detached without separating or contacting the pipes. Alternatively, it is preferable that the notch on one end and the notch on the other end are discontinuous, and a residual portion having a predetermined width is formed between the notches.

It is preferable that a gasket in a form of a circular ring plate is integrally attached between one end and the other end so as to be orthogonal to an axis. If the positioning ring is configured as stated above, it is possible to attach or detach the positioning ring and the gasket simultaneously and easily without separating or contacting the pipes.

It is preferable that the positioning ring is elastically deformed since the positioning ring can be easily attached or detached and used repeatedly.

A fluid supply device using such a positioning ring can be made compact and easily attach or detach pipes.

The conventional technique further has the following problem. A so-called flange joint is intended to connect pipes by pressure-bonding flanges provided on ends of the respective pipes. By way of example, as disclosed in Japanese Published Patent Application No. 2008-286325A, there is known an inclined-surface flange joint applying a radial pressure force on an inclined surface formed on each flange and pressure-bonding the flanges by axial component forces generated at the time of application of the pressure force. The inclined-surface flange joint is characterized by no need to secure an axial length even during attachment or detachment and by compactness.

However, the inclined-surface flange joint disadvantageously needs to use pipes each including a specific flange having an inclined surface and cannot use pipes including existing flanges without inclined surfaces.

The present invention has been achieved to solve the above-stated problem. It is, therefore, an object of the present invention to provide an inclined ring that is a tool capable of using the inclined-surface flange joint even if pipes include existing flanges without inclined surfaces.

Accordingly, an inclined ring according to yet another aspect of the present invention is an inclined ring used to pressure-bond two opposing flanges, wherein the inclined ring is provided separately from each of the flanges, is attached onto a respective rear side of an opposing surface of each of the flanges, and has an inclined surface that is wider outward as the inclined surface is closer to each of the flanges.

Furthermore, a coupling device according to still another aspect of the present invention is a coupling device including a coupling ring, the coupling ring including: a series of unit members configured so that unit members adjacent to each other are rotatably coupled to each other; and a fastener coupling unit members on both ends to each other, wherein the coupling device pressure-bonds two opposing flanges by a pressure force from an inclined sidewall of a concave groove provided to extend circumferentially, and the coupling device comprises an inclined ring, the inclined ring being provided separately from each of the flanges, being attached to respective rear sides of opposing surfaces of the flanges, being wider outward as the inclined ring is closer to each of the flanges, and having an inclined surface corresponding in form to the inclined sidewall.

If the inclined ring is formed out of each of a plurality of divided pieces in a form obtained by dividing a circular ring in a radial direction, the inclined ring can be attached from a radial direction. It is, therefore, effective to use the inclined ring if, for example, the inclined ring is difficult to attach from an axial direction.

A fluid supply device using such an inclined ring can be made compact.

Advantageous Effects of Invention

With this constitution, the stopper member restricts the separation angle between the unit member on one end and the adjacent unit member to fall within the certain angle. Therefore, in the open state in which the unit members on both ends are not coupled, the unit member on one end that is inserted into downward of the pipes can be easily pulled up even in a narrow working space without suspending the unit member on one end due to gravity. It is possible to improve working efficiency in coupling the flanges.

According to the present invention, each of the pipes can be passed through radially from the enlarged notch by adding only such a notch configured simply. Therefore, the positioning ring can be easily attached or detached without axially separating or contacting the paired pipes or only by slightly separating the pipes.

According to the present invention, the required inclined surface can be attached onto each flange. Therefore, even for existing flanges without inclined surfaces, such a flange joint can be used to convert radial pressure forces applied onto the respective attached inclined surfaces into axial components of force, and to pressure-bond the flanges. Since the flange joint is not required to have an axial length at the time of attachment or detachment, pipes can be configured to be compact.

DETAILED DESCRIPTION OF THE EMBODIMENTS

Figure 1:
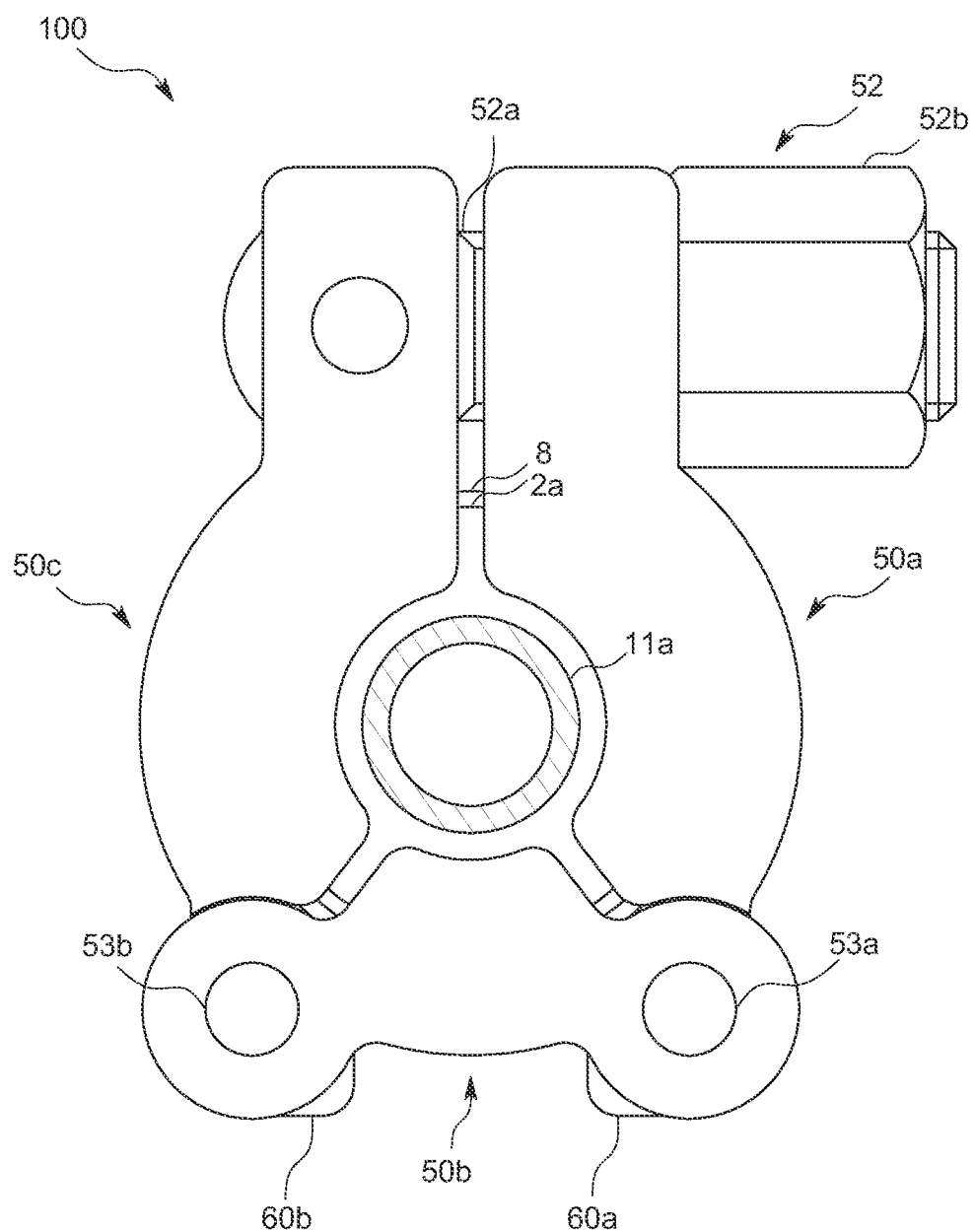
FIG. 1 is a schematic diagram showing a state of coupling pipes using a coupling ring according to a first embodiment of the present invention in an axial direction.

Embodiments of the present invention will be described hereinafter with reference to the accompanying drawings.
<First Embodiment>

A coupling ring 100 according to a first embodiment of the present invention is a constituent component of a flange joint 300, and intended to connect in series a pair of pipes 1a and 1b including flanges 2a and 2b on ends, respectively. This flange joint 300 connects the pipes 1a and 1b to each other by coupling the flanges 2a and 2b provided on the ends of the respective pipes 1a and 1b. The flange joint 300 includes a gasket 7, a positioning ring 8, and the coupling ring 100. The pipes 1a and 1b will first be described.

Figure 3:
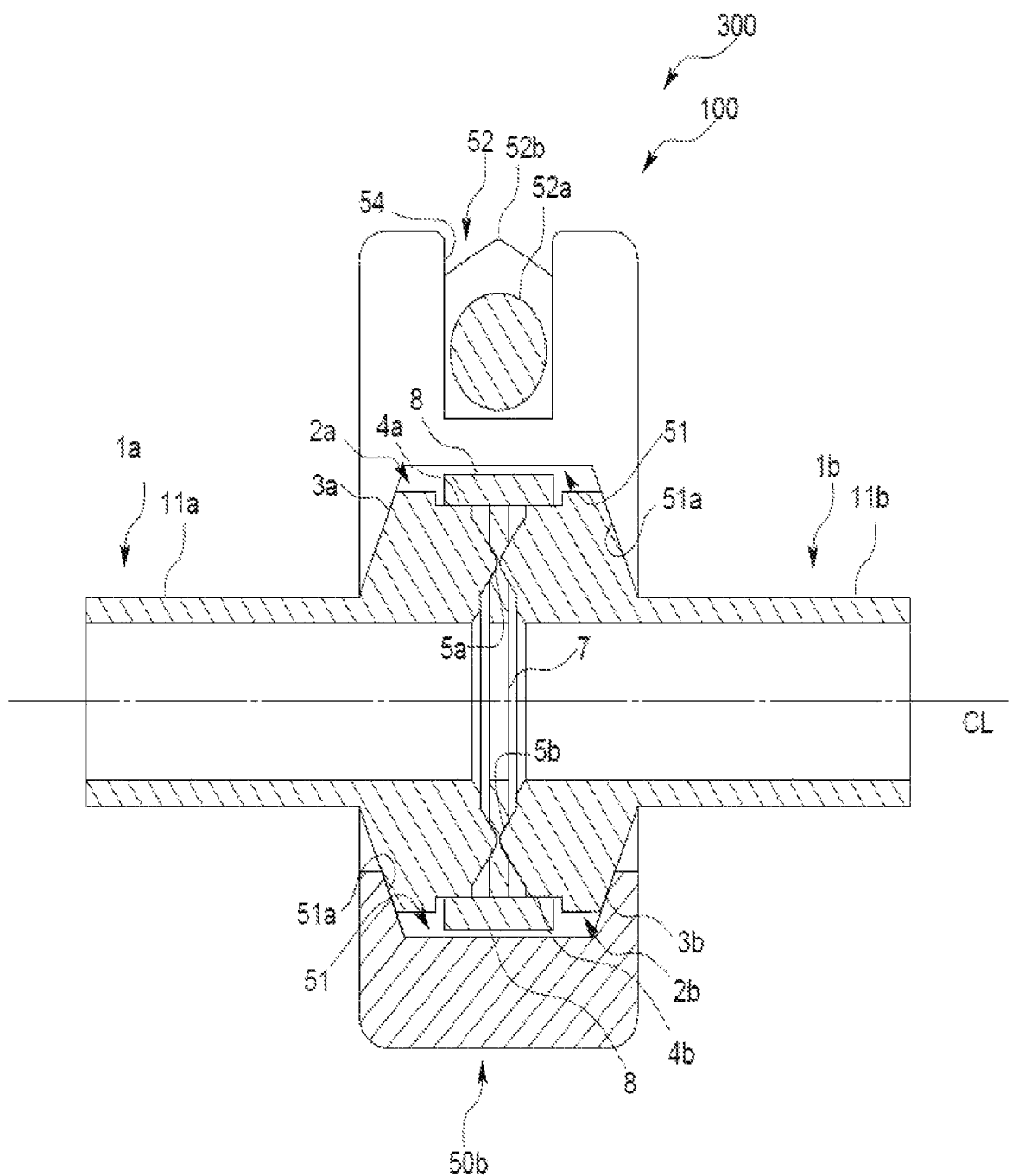
FIG. 3 is a longitudinal sectional view showing a state of coupling the pipes using the coupling ring according to the first embodiment.

As shown in FIG. 3 and the like, the pipes 1a and 1b include pipe main bodies 11a and 11b, and disk flanges 2a and 2b provided on ends of the pipe main bodies 11a and 11b, respectively, and are coupled to each other by opposing tip end surfaces of the flanges 2a and 2b to each other. The flanges 2a and 2b have closed annular protrusions 5a and 5b provided on tip end surfaces (hereinafter, also "opposing surfaces") of the flanges 2a and 2b, and have inclined surfaces 3a and 3b on rear surfaces thereof, respectively. The inclined surfaces 3a and 3b have larger diameters as being closer to tip ends thereof. Furthermore, stepped portions 4a and 4b are provided on outer peripheral surfaces of the tip end portions of flanges 2a and 2b, respectively.

If the pipes 1a and 1b are coupled to each other, the gasket 7 in the form of an equal-thickness annular plate is sandwiched between the opposing surfaces of the flanges 2a and 2b. At this time, the positioning ring 8 is externally fitted into the stepped portions 4a and 4b of the flanges 2a and 2b without backlash.

The gasket 7 has an inside diameter identical to those of the pipes 1a and 1b and an outside diameter identical to those of the stepped portions 4a and 4b, and ensures airtightness by causing the protrusions 5a and 5b to enter into the gasket 7.

The positioning ring 8 is a cylindrical member having an inside diameter identical to the outside diameter of the stepped portions 4a and 4b and intended to precisely make central axes CL of the pipes 1a and 1b coincident with each other.

Figure 2:
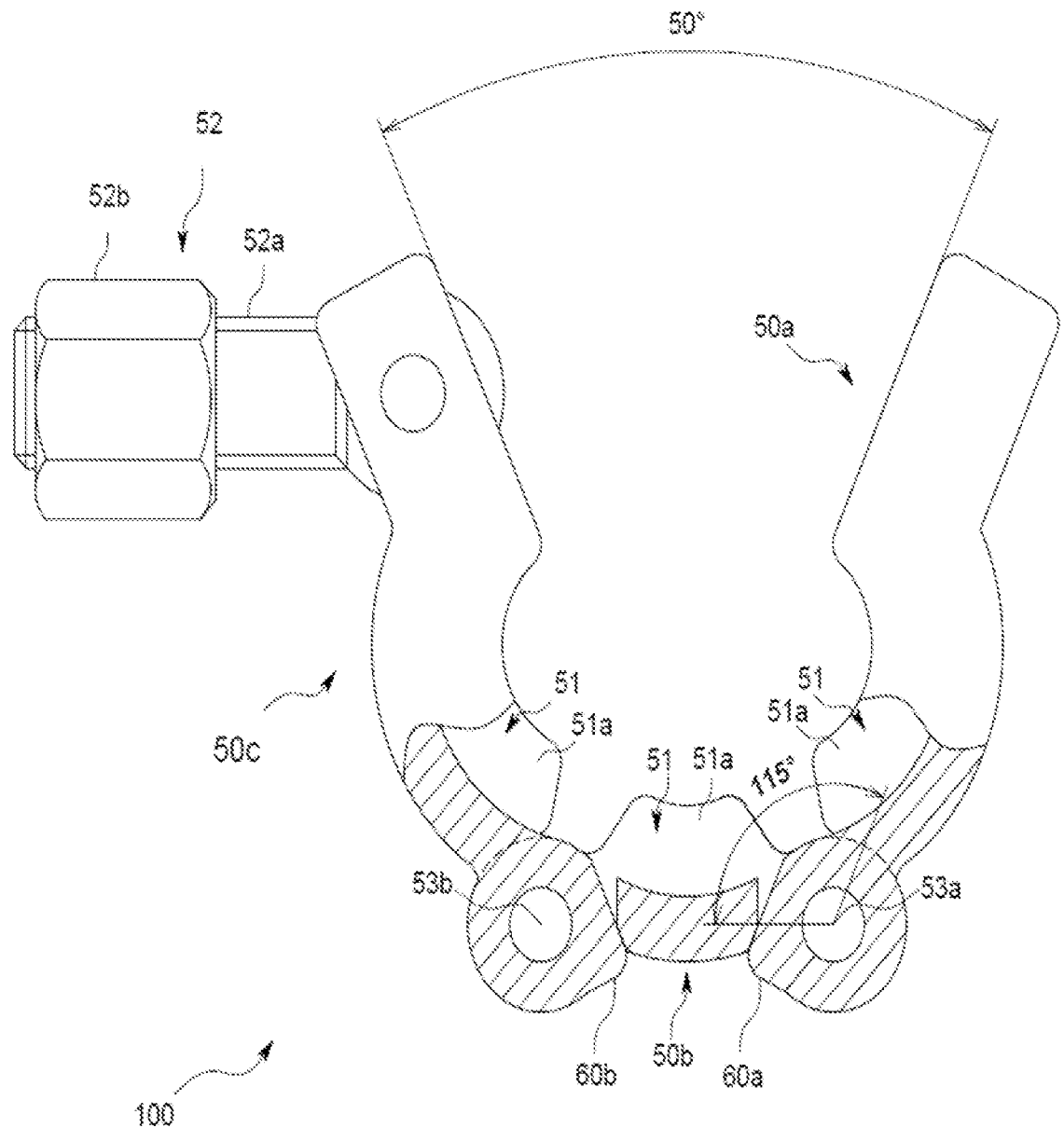
FIG. 2 is a partial cross-sectional view showing an open state of the coupling ring according to the first embodiment.

In this way, the coupling ring 100 is externally fitted into the opposing flanges 2a and 2b to fasten and couple the flanges 2a and 2b to each other. As shown in FIGS. 1 and 2, the coupling ring 100 includes a plurality of (three in FIGS. 1 and 2) unit members 50a to 50c configured so that adjacent unit members are coupled to be rotatable about shafts 53a and 53b, and a fastener 52 coupling the unit members 50a and 50c to each other on both ends. The constituent elements will be described in detail.

As shown in FIG. 2 and the like, the unit members 50a to 50c are generally in the shape obtained by dividing an annular circle into three segments when viewed from an axial direction. On an inner circumferential surface of each of the unit members 50a to 50c, a concave groove 51 having such a width as to be able to be externally fitted into outer circumferences of the paired opposing flanges 2a and 2b is provided to extend circumferentially. An inclined surface 51a corresponding to the inclined surface 3a or 3b on the rear surface of the flange 2a or 2b is formed on a side surface of this concave groove 51.

As shown in FIG. 2 and the like, the fastener 52 includes, for example, a bolt member 52a and a nut member 52b. The bolt member 52a is configured so that a proximal end of the bolt member 52a is rotatably coupled to a tip end portion of the unit member 50c on one end, and that a distal end thereof is fitted into a groove-like notch 54 provided on a tip end portion of the unit member 50a on the other end. The fastener 52 can couple the unit members 50a and 50b on the both ends by mating the nut member 52b with the bolt member 52a that is fitted into the notch 54 and that protrudes, and can expand or reduce an inner circumferential diameter of the coupling ring 100.

Stopper members 60a and 60b are generally triangular prism-like protrusions provided on an outer periphery near a portion where the unit members 50a and 50c on the both ends are coupled to each other. In a state in which a separation angle between the unit member 50a or 50c on one end and the adjacent unit member 50b is narrower than a certain angle, the stopper members 60a and 60b do not abut on the unit member 50b. In a state in which the separation angle is equal to the certain angle, the stopper members 60a and 60b abut on the unit member 50b as shown in FIG. 2. Therefore, the separation angle does not increase to be greater than the certain angle. The certain angle suffices, for example, to be within 180 degrees. In this example, the certain angle is set to 115 degrees as shown in FIG. 2, and an angle between the unit members 50a and 50c on the both ends at this time degrees is 50 degrees.

A method of coupling the pipes 1a and 1b in series using the coupling ring 100 according to this embodiment will next be described.

First, one end portion of the positioning ring 8 is externally fitted into the stepped portion 4a of one pipe 1a. Next, the gasket 7 and the other stepped portion 4b are sequentially fitted into the other end portion of the positioning ring 8. It is thereby possible to precisely coincide the central axes of the pipes 1a and 1b and the gasket 7 with one another.

Next, the unit member 50a on one end of the coupling ring 100 in an open state in which the both ends are not coupled is inserted into downward of the flanges 2a and 2b from one side of the flanges 2a and 2b, and one end of the coupling ring 100 is pulled up from the other side. At this time, the concave groove 51 is externally fitted into the outer circumferences of the opposing flanges 2a and 2b.

Thereafter, if the bolt member 52a is fitted into the notch 54 of the unit member 50a, the nut member 52b is fastened, and the inner circumferential diameter of the coupling ring 100 is made smaller, the inclined surface 51a formed on the side surface of the concave groove 51 presses the inclined surfaces 3a and 3b formed on the rear surfaces of the flanges 2a and 2b. Axial components of force generated at that time press the flanges 2a and 2b against each other, the protrusions 5a and 5b enter into both surfaces of the gasket 7, and the pipes 1a and 1b are connected to each other with airtightness kept sufficiently.

With such a configuration, the separation angle between each of the unit members 50a and 50c on the both ends and the adjacent unit member 50b is restricted to fall within the certain angle by simply additionally providing the stopper members 60a and 60b on the unit members 50a and 50b on the both ends, respectively. This can prevent both of the unit members 50a and 50b on the both ends from being suspended by the gravity. Therefore, even if whichever side of the coupling ring 100 is inserted into downward of the flanges 2a and 2b in a small working space, the flanges 2a and 2b can be easily coupled to each other.

Additionally, a fluid supply device can be configured using the flange joint 300 according to this embodiment. For example, the fluid supply device is configured to include gas supply lines L1 that are three longitudinal fluid lines provided in parallel, and one horizontal fluid line that is provided among these gas supply lines L1 and that is a cleaning gas supply line L2, in the example shown in FIG. 4, supplying cleaning gas to the respective gas supply lines L1.

Each of the longitudinal fluid lines L1 includes a fluid device such as a mass flow controller X11 or the like and is configured to function as a gas supply line. The horizontal fluid line 12 is configured to function as the cleaning gas supply line. While it is described herein that the flange joint 300 is used for each of all pipe connections, the present invention is not limited to this example. It suffices to use the flange joint 300 for at least one pipe connection.

Figure 4:
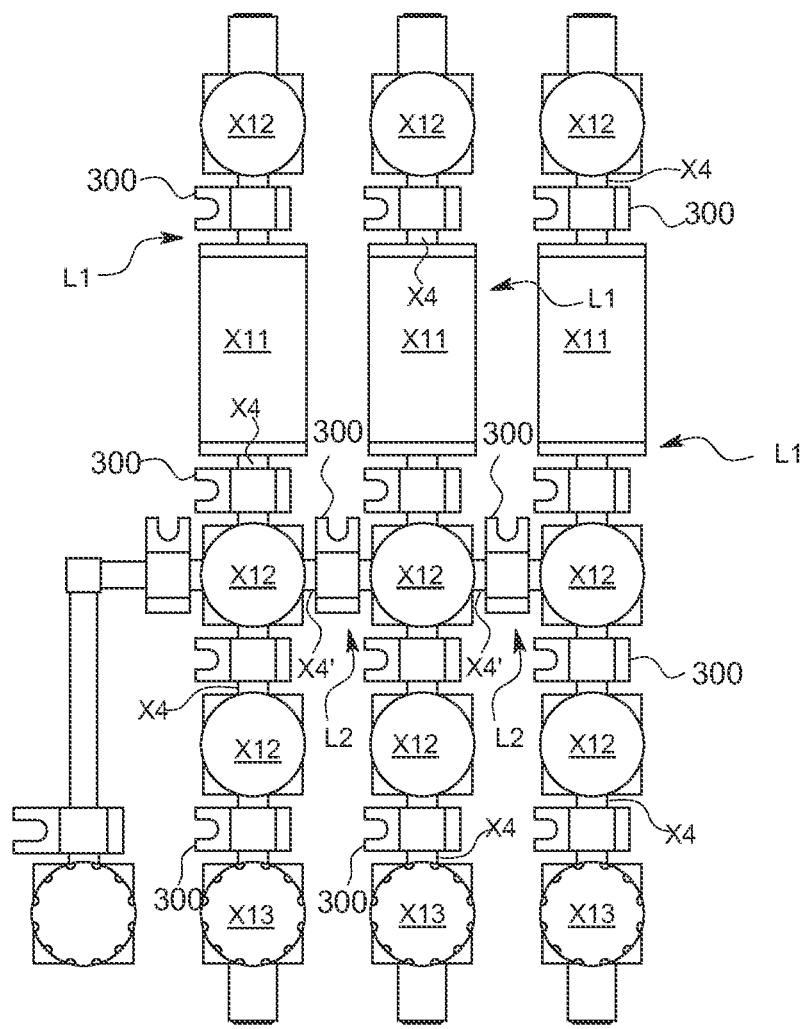
FIG. 4 is a configuration diagram of a fluid supply device using the coupling ring according to the first embodiment.

In FIG. 4, reference symbol L1 denotes the gas supply line, L2 denotes the cleaning gas supply line, X11 denotes the mass flow controller, X12 and X13 denote valves or pressure sensors, 300 denotes the flange joint, and X4 and X4' denote piping.

The present invention is not limited to this embodiment. For example, in this embodiment, the stopper members are provided in two portions. Alternatively, the stopper member can be provided, for example, in at least one portion out of the unit member on each end and the adjacent unit member.

Furthermore, it is described in this embodiment that the stopper members always restrict the separation angle between the unit member on one end and the adjacent unit member is within the certain angle. Alternatively, the stopper members can be configured, for example, to restrict the separation angle at the time of a step of constructing an annular shape and to be moved or prevented from abutting on the unit members so that the stopper members do not restrict the separation angle in the other steps.

Moreover, the stopper members can be configured, for example, to temporarily hold the separation angle when the separation angle is equal to one predetermined angle or one of a plurality of predetermined angles. "To temporarily hold the certain angle" means that the stopper members can hold the separation angle to be the predetermined angle in a state of applying no force in a separation direction, and that the separation angle can exceed the predetermined angle when a force is applied in the separation direction.

That is, it suffices that at least one end of the coupling ring in the open state is not suspended by the gravity to the extent that the coupling ring can be easily pulled up even in the small working space in the step of constructing the annular shape of the coupling ring.

Further, the coupling ring is described in this embodiment to include the three unit members. However, it suffices that the coupling ring includes a plurality of unit members.

In this embodiment, the stopper member is provided between the unit member on one end and the adjacent unit member. However, the present invention is not limited to this embodiment. For example, in a coupling ring configured, for example, to connect four or more unit members in series, a stopper member can be provided between at least one unit member and the adjacent unit member.

One embodiment of the present invention will be described with reference to the drawings.

<Second Embodiment>

Figure 5:
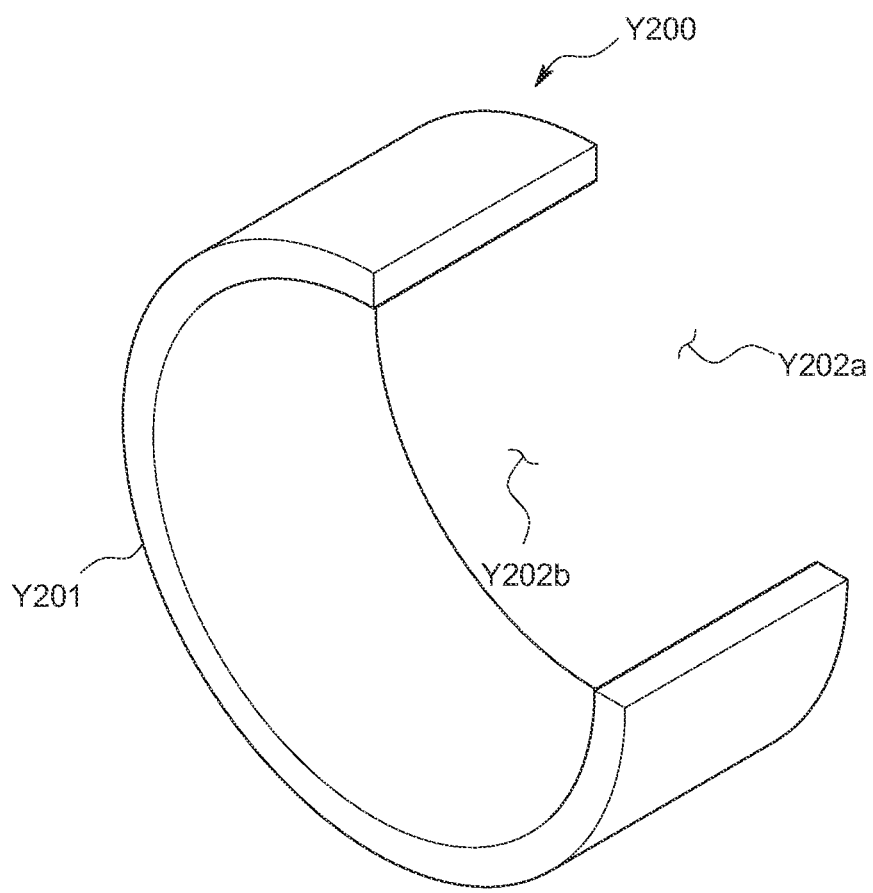
FIG. 5 is an overall perspective view of a positioning ring according to a second embodiment of the present invention.
Figure 6:
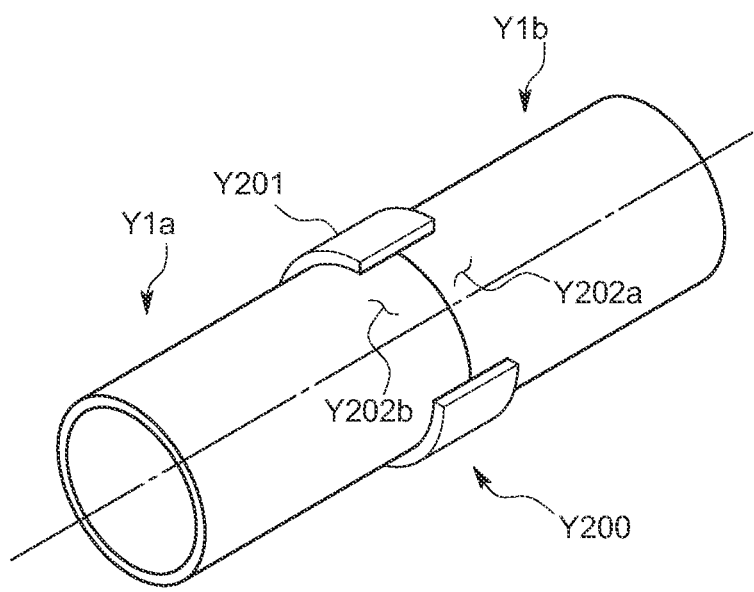
FIG. 6 is a perspective view showing a state of holding pipes using the positioning ring according to the second embodiment.

A positioning ring Y200 according to a second embodiment of the present invention holds a pair of pipes Y1a and Y1b while making central axes of the pipes Y1a and Y1b coincident with each other. The positioning ring Y200 includes an elastically deformed holder Y201 in which notches Y200a and Y200b are formed as shown in FIG. 5.

The holder Y201 has a partially cylindrical C-shape if being viewed from an axial direction, and has an inside diameter identical to an outside diameter of the end of each of the pipes Y1a and Y1b to be described later. The holder Y201 is set to have an axial length so that the holder Y201 can hold the pipes Y1a and Y1b while making the central axes of the pipes Y1a and Y1b coincident with each other.

The notches Y202a and Y202b are grooves penetrating in a thickness direction of the holder Y201, and extend linearly in the axial direction so that the notch Y202a on one end is continues to the notch Y202b on the other end. A width of each of these notches Y202a and Y202b, that is, a central angle thereof if viewed from the axial direction is set to 90 degrees in this embodiment.

Operation for attaching or detaching the positioning ring Y200 according to this embodiment will be described.

At the time of attachment, the positioning ring Y200 is elastically deformed and fitted into the pipes Y1a and Y1b arranged in series by pressing the notches Y202a and Y202b against the pipes Y1a and Y1b in a radial direction. As a result, the central axes of the pipes 1a and 1b coincide with each other and are held. As other attachment methods, there is, for example, an attachment method including fitting the positioning ring Y200 into the pipes Y1a and Y1b from the radial direction while enlarging widths of the notches Y202a and Y202b.

At the time of detachment, the positioning ring Y200 is pulled in the radial direction, elastically deformed, and detached. As other detachment methods, there is, for example, a detachment method including pulling the positioning ring Y200 in the radial direction and detaching the positioning ring Y200 from the pipes Y1a and Y1b while enlarging the widths of the notches Y202a and Y202b.

If the positioning ring Y200 is configured as stated above, the positioning ring Y200 can be easily attached or detached to or from the pipes Y1a and Y1b without making the positioning ring Y200 complex and without separating or contracting the pipes Y1a and Y1b but only by providing the notches Y202a and Y202b quite simple in shape in the positioning ring Y200. Alternatively, the positioning ring Y200 can be attached or detached to or from the pipes Y1a and Y1b by axially separating or contacting the pipes Y1a and Y1b similarly to the conventional technique.

<Third Embodiment>

Figure 7:
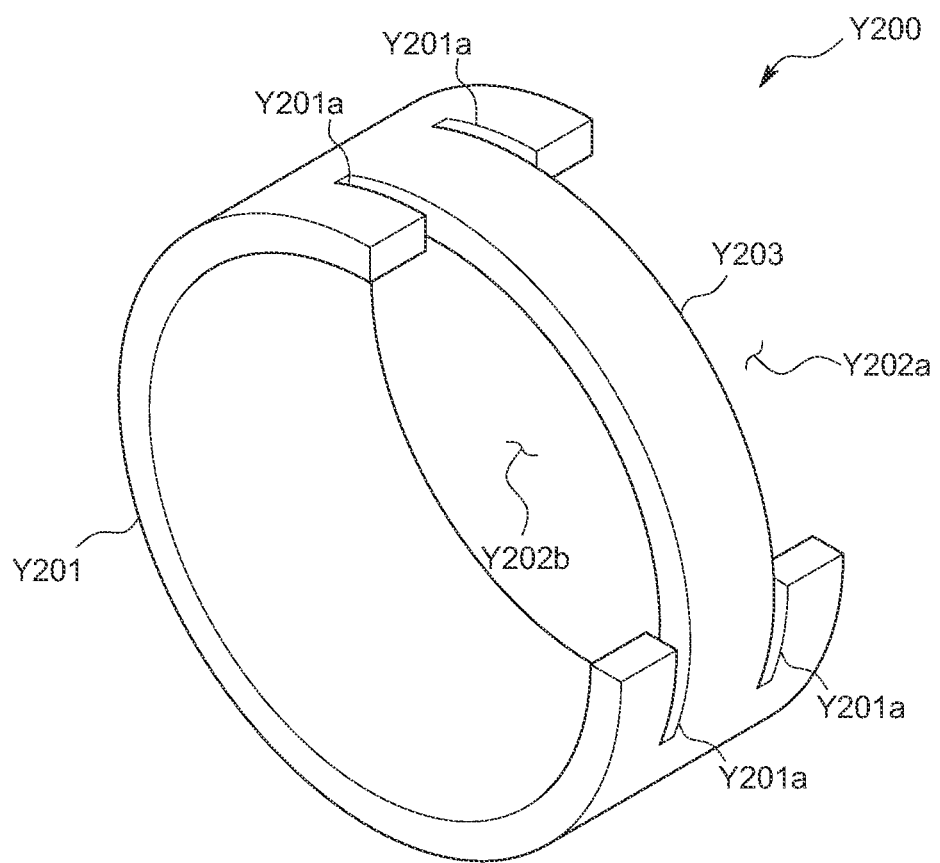
FIG. 7 is an overall perspective view of a positioning ring according to a third embodiment of the present invention.

A positioning ring Y200 according to a third embodiment of the present invention includes the elastically deformed holder Y201 having the notch Y202a on one end and the notch Y202b on the other end formed discontinuously, and a residual portion Y203 as shown in FIG. 7.

The residual portion Y203 is a circular arc-shaped member having a predetermined width and formed between the notch Y202a on one end and the notch Y202b on the other end. The width of the residual portion Y203 is sufficiently smaller than a width of the holder Y201 and smaller than an axial separation distance between the pipes Y1a and Y1b.

Groove-like cuts Y201a intended to extend the residual portion Y203 in a circumferential direction are provided to make it easier to enlarge the holder Y201.

If the positioning ring Y200 is configured as stated above, the other configurations of the positioning ring Y200 are similar to those of the positioning ring Y200 according to the second embodiment except that the pipes Y1a and Y1b need to slightly separate or contact axially. The third embodiment also exhibits an advantage in that the positioning ring Y200 can be easily attached or detached.

<Fourth Embodiment>

A positioning ring Y200 according to a fourth embodiment of the present invention is a constituent component of a flange joint Y300 and holds a pair of pipes Y1a and Y1b that include flanges Y2a and Y2b on ends, respectively while making central axes of the pipes Y1a and Y1b coincident with each other. This flange joint Y300 connects the pipes Y1a and Y1b to each other by coupling the flanges Y2a and Y2b provided on the ends of the respective pipes Y1a and Y1b. The flange joint Y300 includes a gasket 7, the positioning ring Y200, and a coupling ring Y100. The pipes Y1a and Y1b will first be described.

Figure 9:
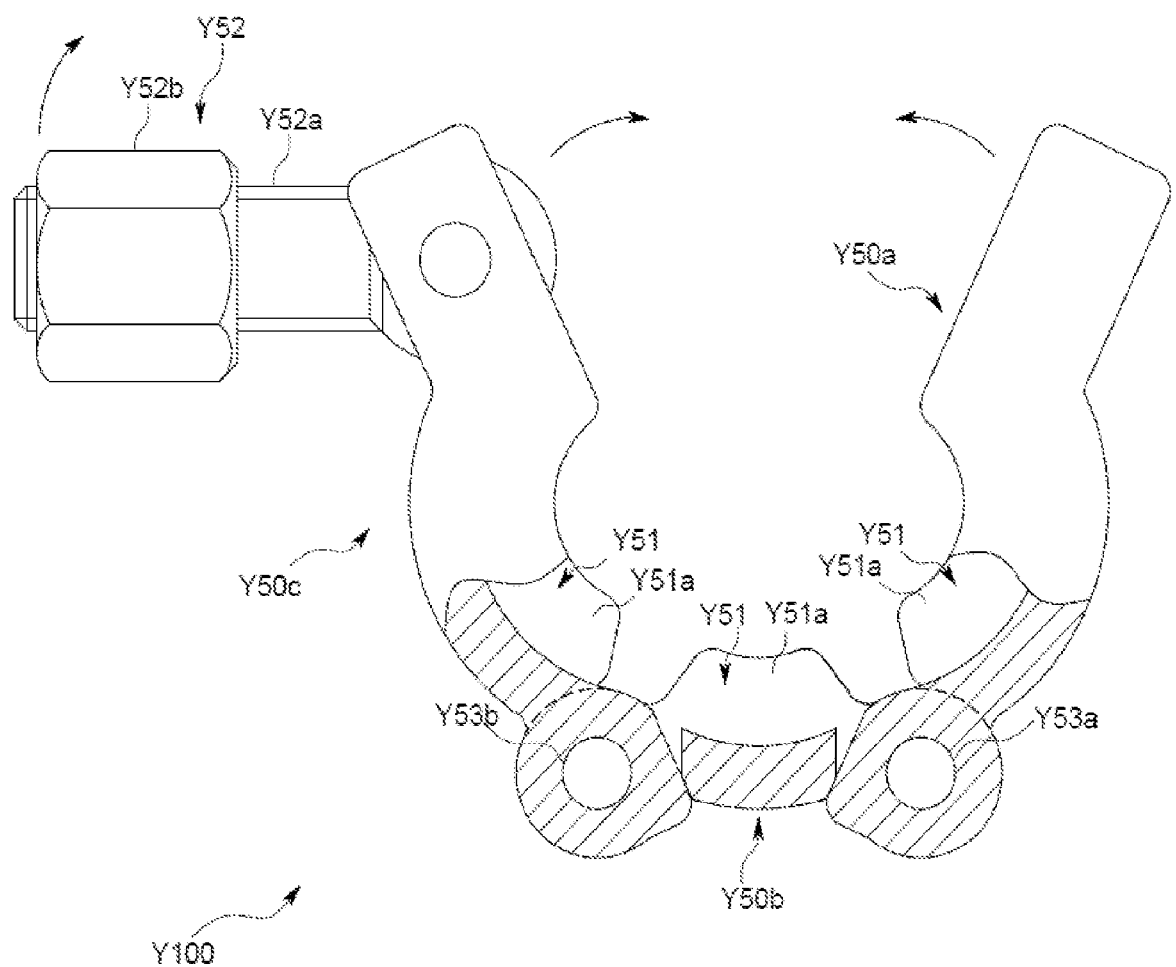
FIG. 9 is a partial cross-sectional view of the coupling ring according to the fourth embodiment.

As shown in FIG. 9 and the like, the pipes Y1a and Y1b include pipe main bodies Y11a and Y11b, and disk flanges Y2a and Y2b provided on ends of pipe main bodies Y11a and Y11b, respectively, and are coupled to each other by opposing tip end surfaces of the flanges Y2a and Y2b to each other. The flanges Y2a and Y2b have closed annular protrusions Y5a and Y5b provided on tip end surfaces (hereinafter, also "opposing surfaces") of the flanges Y2a and Y2b, and have inclined surfaces Y3a and Y3b on rear surfaces thereof. The inclined surfaces Y3a and Y3b have larger diameters as being closer to tip ends thereof. Furthermore, stepped portions Y4a and Y4b are provided on outer circumferential surfaces of the tip end portions of flanges Y2a and Y2b, respectively.

If the pipes Y1a and Y1b are to be coupled to each other, the gasket Y7 in the form of an equal-thickness annular plate is sandwiched between the opposing surfaces of the flanges Y2a and Y2b. At this time, the positioning ring Y200 is externally fitted into the stepped portions Y4a and Y4b of the flanges Y2a and Y2b without backlash. Further, the coupling ring Y100 is externally fitted into the opposing flanges Y2a and Y2b to fasten and couple the flanges Y2a and Y2b to each other. The constituent elements will be described in detail.

The gasket Y7 has an inside diameter identical to those of the pipes Y1a and Y1b and an outside diameter identical to those of the stepped portions Y4a and Y4b, and ensures airtightness by causing the protrusions Y5a and Y5b to enter into the gasket Y7.

The positioning ring Y200 is similar in shape to the positioning ring Y8 according to the second embodiment, and has an inside diameter identical to the outside diameters of the stepped portions Y4a and Y4b.

The coupling ring Y100 includes a plurality of (three in this embodiment) unit members Y50a to Y50c configured so that adjacent unit members are coupled to be rotatable, and a fastener Y52 coupling the unit members Y50a and Y50c on both ends.

As shown in FIG. 9, the unit members Y50a to Y50c are generally in the shape obtained by dividing an annular circle into three segments when viewed from an axial direction. On an inner circumferential surface of each of the unit members Y50a to Y50c, a concave groove Y51 having such a width as to be able to be externally fitted into outer circumferences of the paired opposing flanges Y2a and Y2b is provided to extend circumferentially. An inclined surface Y51a corresponding to the inclined surface Y3a or Y3b on the rear surface of the flange Y2a or Y2b is formed on a side surface of this concave groove Y51.

As shown in FIG. 9, the fastener Y52 includes, for example, a bolt member Y52a having a proximal end attached to the unit member Y50c and a nut member Y52b. The fastener Y52 can couple the unit members Y50a and Y50c on the both ends to each other by fitting a distal end of the bolt member Y52a into a bolt inlet Y54 and mating the nut member Y52b with the bolt member Y52a, and can expand or reduce an inner circumferential diameter of the coupling ring Y100.

A method of coupling the pipes Y1a and Y1b in series and separating the pipes Y1a and Y1b using the positioning ring Y200 according to this embodiment will next be described.

First, at the time of coupling, one end portion of the positioning ring Y200 is externally fitted into the stepped portion Y4a of one pipe Y1a. Next, the gasket Y7 and the other stepped portion Y4b are sequentially fitted into the other end portion of the positioning ring Y200.

Figure 8:
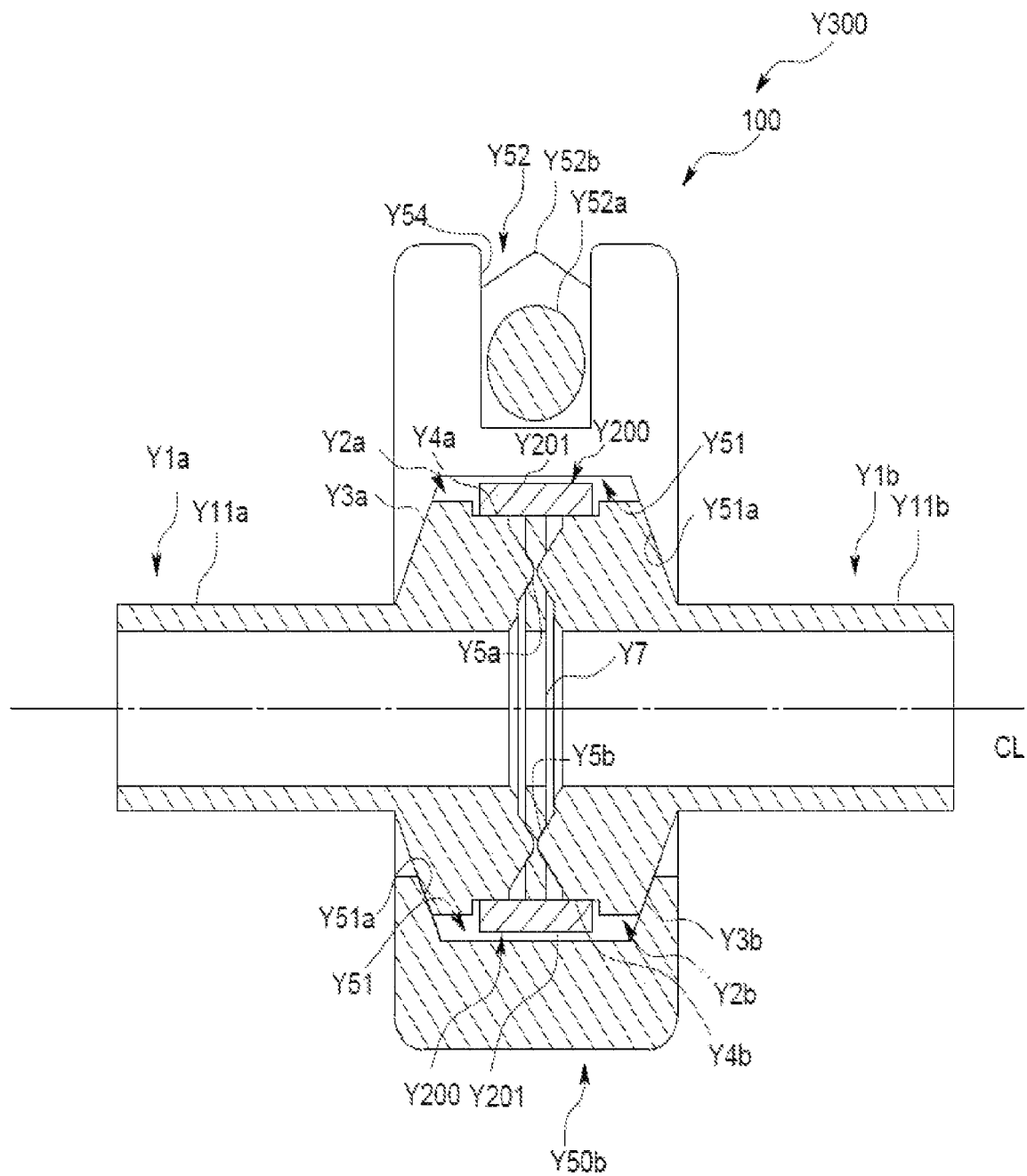
FIG. 8 is a longitudinal sectional view showing a state of holding pipes using a positioning ring according to a fourth embodiment of the present invention.

Next, the concave groove Y51 of the coupling ring 100 in an open state in which the both ends are not coupled is externally fitted into outer circumferences of the opposing flanges Y2a and Y2b. If the faster Y52 is fastened to make the inner circumferential diameter of the coupling ring Y100 smaller, the inclined surface Y51a formed on the side surface of the concave groove Y51 presses the inclined surfaces Y3a and Y3b formed on the rear surfaces of the respective flanges Y2a and Y2b as shown in FIG. 8. Axial components of force generated at that time press the flanges Y2a and Y2b against each other, the protrusions Y5a and Y5b enter into both surfaces of the gasket Y7, and the pipes Y1a and Y1b are connected to each other with airtightness kept sufficiently.

At the time of separation, the fastener Y52 is first loosened to detach the coupling ring Y100. The positioning ring Y200 is detached in the radial direction without separating the pipes Y1a and Y1b from each other similarly to the second embodiment.

Needless to say, the positioning ring Y200 according to the second or third embodiment can be used as the constituent component of the flange joint Y300 according to the fourth embodiment.

Additionally, a fluid supply device can be configured using the flange joint Y300 according to the fourth embodiment. For example, the fluid supply device is configured to include gas supply lines YL1 that are three longitudinal fluid lines provided in parallel, and one horizontal fluid line that is provided among these gas supply lines YL1 and that is a cleaning gas supply line YL2, in this embodiment, supplying cleaning gas to the respective gas supply lines YL1.

Each of the longitudinal fluid lines YL1 includes a fluid device such as a mass flow controller YX11 or the like and is configured to function as a gas supply line. The horizontal fluid line YL2 is configured to function as the cleaning gas supply line. While it is described herein that the flange joint Y300 is used for each of all pipe connections, the present invention is not limited to this example. It suffices to use the flange joint Y300 for at least one pipe connection.

Figure 11:
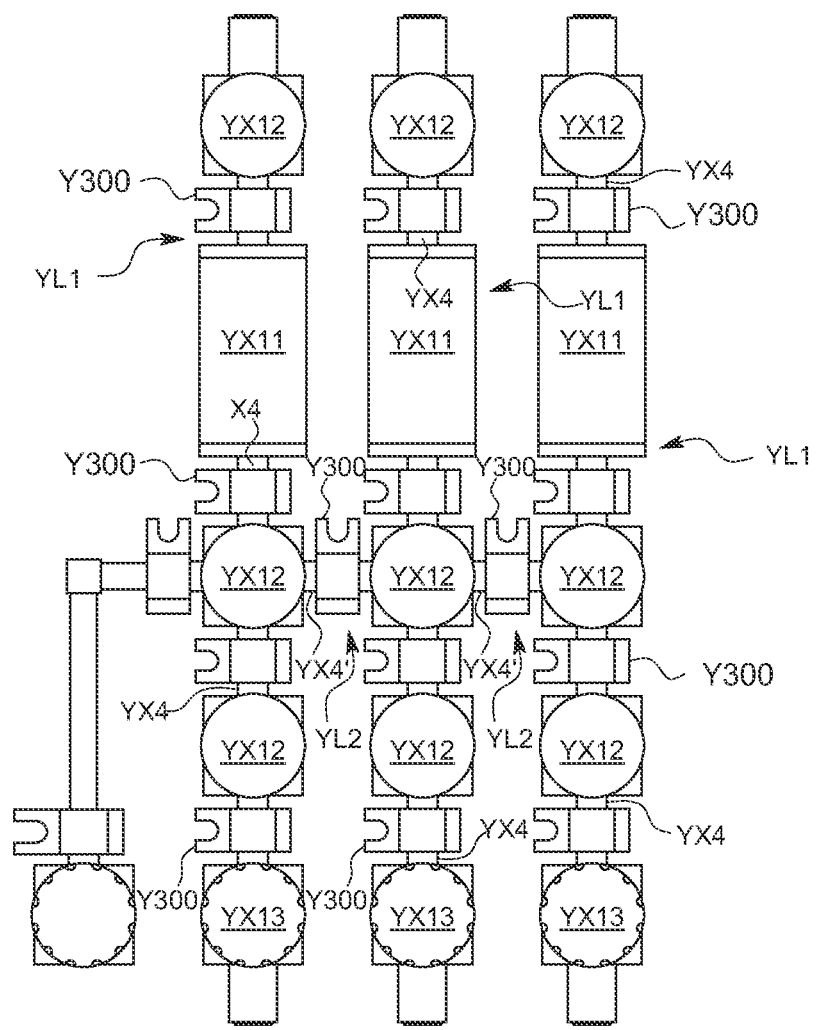
FIG. 11 is a configuration diagram of a fluid supply device using the positioning ring according to the fourth embodiment.

In FIG. 11, reference symbol YL1 denotes the gas supply line, YL2 denotes the cleaning gas supply line, YX11 denotes the mass flow controller, YX12 and YX13 denote valves or pressure sensors, Y300 denotes the flange joint, and YX4 and YX4' denote piping.

The present invention is not limited to the fourth embodiment. For example, while notches are shown to extend axially in this embodiment, the notches can be configured to extend aslant. While it is shown that a central angle of each of the notches is smaller than 180 degrees and a holder has a partially cylindrical C-shape, the holder can be configured to have a helical shape such as a spring.

Alternatively, the holder can be formed out of a material that is not substantially elastically deformed. In this alternative, the holder needs to be plastically deformed if the positioning ring is detached radially.

The residual portion can be formed into a shape, out of a material or the like that enables breaking more easily than the other portions. In this alternative, the residual portion can be broken if the positioning ring is to be detached radially without separating the pipes.

In another alternative, the residual portion can be configured to enlarge at the time of attachment or detachment by rotatably coupling one of roots of the residual portion to the holder and making the other root thereof detachable.

By so configuring, the positioning ring can be detached radially without separating the pipes. Moreover, it suffices that a width of the residual portion is equal to or smaller than that of the holder.

Figure 10:
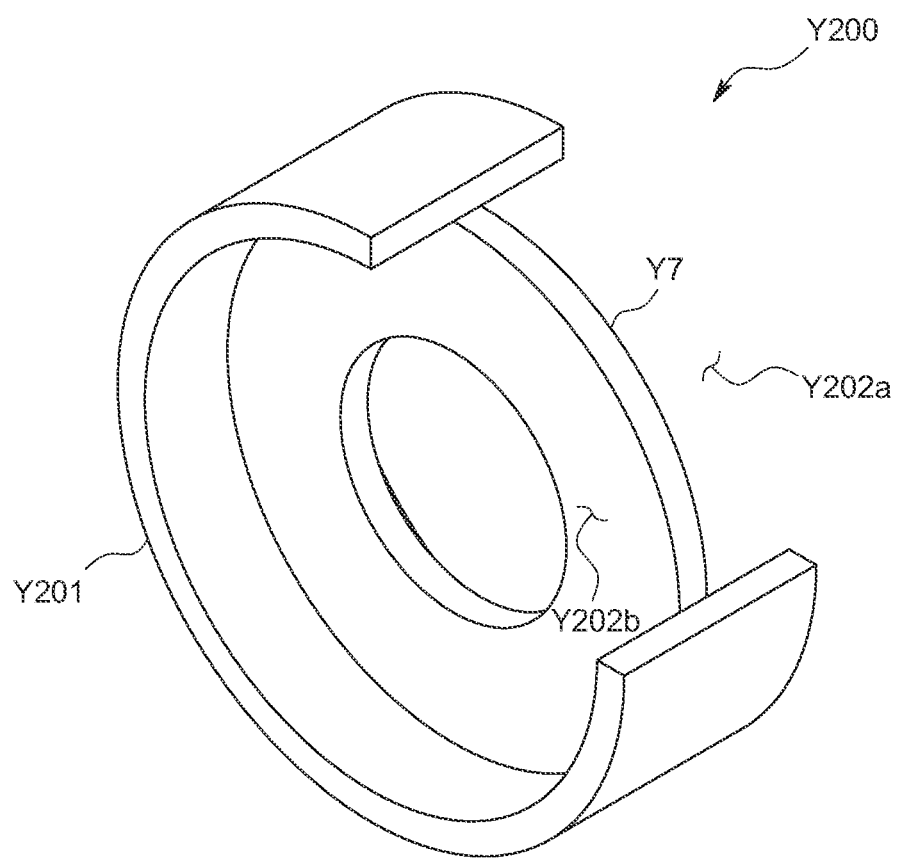
FIG. 10 is an overall perspective view of a positioning ring according to a modification of the fourth embodiment.

As shown in FIG. 10, the gasket can be configured to be integrally attached between one end and the other end of the positioning ring and to be attached to the residual portion or the like formed similarly to the third embodiment. In sum, it suffices that parts of the holder divided according to a position of the gasket have widths that enable the holder to hold the paired pipes while coinciding the central axes of the pipes with each other.

In the fourth embodiment, if the positioning ring is to be attached from the radial direction, it often happens that the attachment operation is difficult to carry out after the gasket falls off from between the pipes during the attachment operation. However, the positioning ring is configured to integrally attach the gasket to the positioning ring, there is no need to hold the gasket so as not to fall off from the positioning ring. Therefore, similarly to the second embodiment, the positioning ring can be easily attached or detached from either the radial direction or the axial direction without separating or contacting the pipes. Moreover, the positioning ring and the gasket can be attached or detached only by a step of attaching or detaching the positioning ring.

Furthermore, an outer circumferential surface of the gasket is preferably not bonded at a certain distance from at least circumferentially one end of an inner circumferential surface of the holder since the gasket can be easily elastically deformed so as to enlarge the notches.

A fifth embodiment of the present invention will be described with reference to the drawings.

<Fifth Embodiment>

An inclined ring Z200 is a constituent component of a flange joint Z300 and intended to make it possible to use the inclined-surface flange joint for each of existing flanges Z2a and Z2b without inclined surfaces. This flange joint Z300 connects pipes Z1a and Z1b by coupling the flanges Z2a and Z2b provided on ends of the respective pipes Z1a and Z1b. The flange joint 300 includes a gasket Z7, the inclined ring Z200, and a coupling ring Z100. The pipes Z1a and Z1b will first be described.

Figure 14:
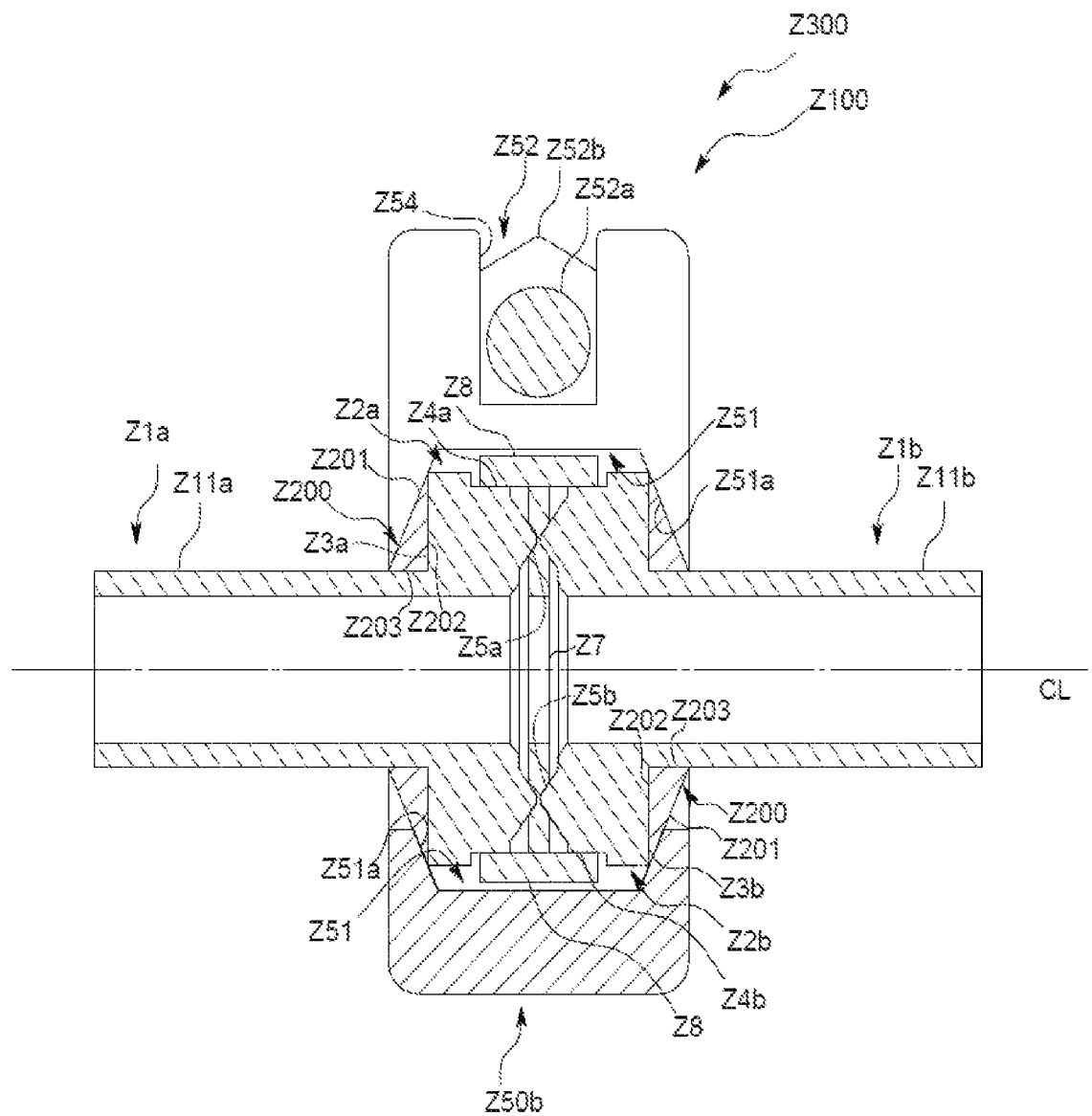
FIG. 14 is a longitudinal sectional view showing a state of coupling pipes using the inclined ring according to the fifth embodiment.

As shown in FIG. 14 and the like, the pipes Z1a and Z1b include pipe main bodies Z11a and Z11b, and disk flanges Z2a and Z2b provided on ends of the pipe main bodies Z11a and Z11b, respectively, and are coupled to each other by opposing tip end surfaces of the flanges Z2a and Z2b to each other. The flanges Z2a and Z2b have closed annular protrusions Z5a and Z5b provided on tip end surfaces (hereinafter, also "opposing surfaces") of the flanges Z2a and Z2b, and have rear surfaces Z3a and Z3b, respectively perpendicular to the pipe main bodies Z11a and Z11b. Furthermore, stepped portions Z4a and Z4b are provided on outer circumferential surfaces of the tip end portions of the flanges Z2a and Z2b, respectively.

If the pipes Z1a and Z1b are coupled to each other, the gasket Z7 in the form of an equal-thickness annular plate is sandwiched between the opposing surfaces of the flanges Z2a and Z2b. At this time, the positioning ring Z8 is externally fitted into the stepped portions Z4a and Z4b of the flanges Z2a and Z2b without backlash. Furthermore, the coupling ring Z100 is externally fitted into the opposing flanges Z2a and Z2b to fasten and couple the opposing flanges Z2a and Z2b to each other. The respective constituent elements will be described in detail.

The gasket Z7 has an inside diameter identical to those of the pipes Z1a and Z1b and an outside diameter identical to those of the stepped portions Z4a and Z4b, and ensures airtightness by causing the protrusions Z5a and Z5b to enter into the gasket Z7.

The positioning ring Z8 is a cylindrical member having an inside diameter identical to the outside diameters of the stepped portions Z4a and Z4b and intended to precisely make central axes CL of the pipes Z1a and Z1b coincident with each other.

Figure 15:
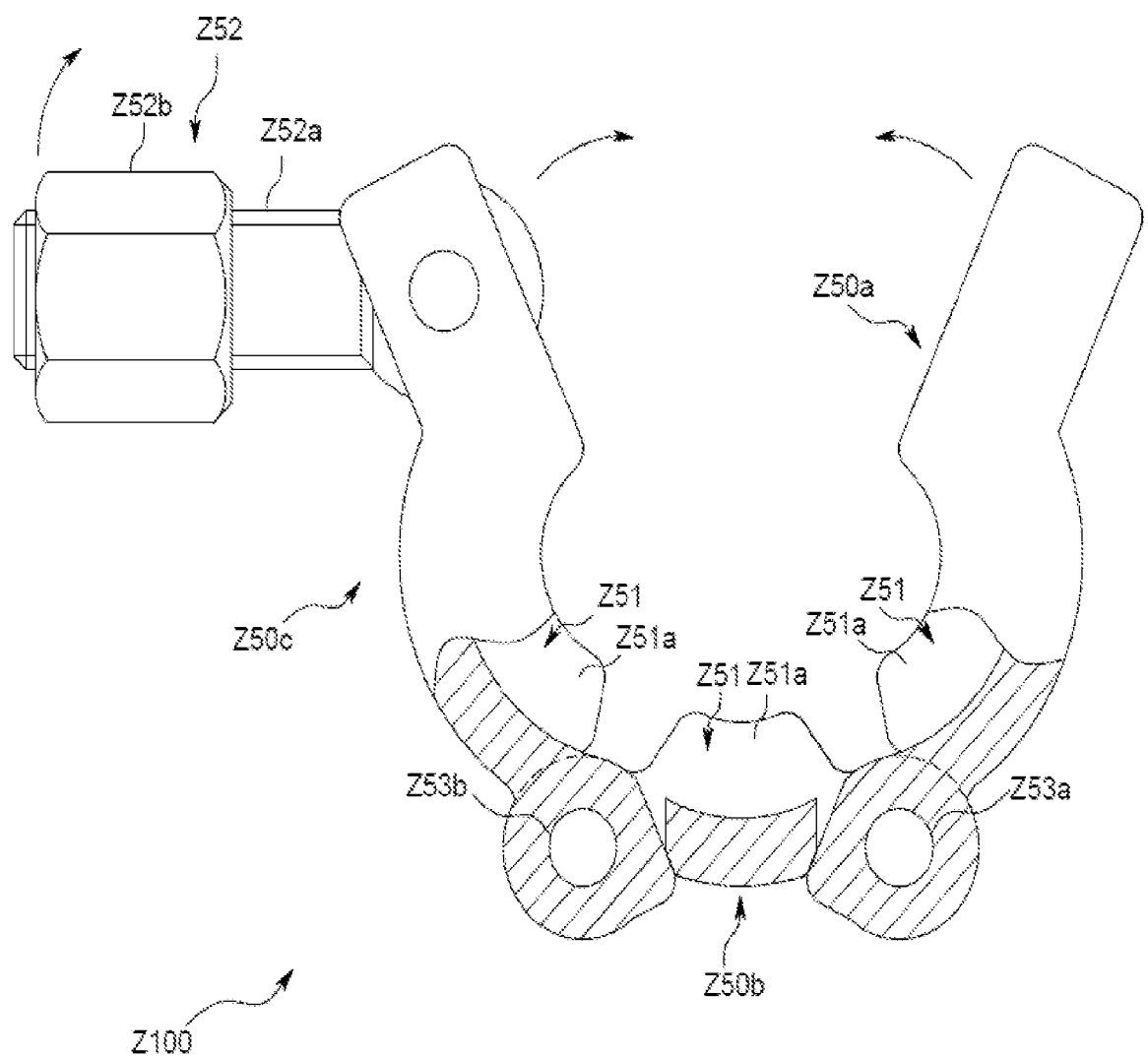
FIG. 15 is a partial cross-sectional view of the coupling ring according to the fifth embodiment.

As shown in FIG. 15, the coupling ring Z100 includes a plurality of (three in this embodiment) unit members Z50a to Z50c configured so that adjacent unit members are coupled to be rotatable, and a fastener Z52 coupling the unit members Z50a and Z50c on both ends.

As shown in FIG. 15 and the like, the unit members Z50a to Z50c are generally in the shape obtained by dividing an annular circle into three segments when viewed from an axial direction. On an inner circumferential surface of each of the unit members Z50a to Z50c, a concave groove Z51 having such a width as to be able to be externally fitted into outer circumferences of the paired opposing flanges Z2a and Z2b is provided to extend circumferentially. An inclined sidewall Z51a is formed on a side surface of this concave groove Z51.

As shown in FIG. 15, the fastener Z52 includes, for example, a bolt member Z52a having a proximal end attached to the unit member Z50c and a nut member Z52b. The fastener Z52 can couple the unit members Z50a and Z50c on the both ends by fitting a distal end portion of the bolt member Z52a into a notch Z54 of the unit member Z50a and mating the nut member Z52b with the unit member Z50a, and can expand or reduce an inner circumferential diameter of the coupling ring Z100.

Figure 12:
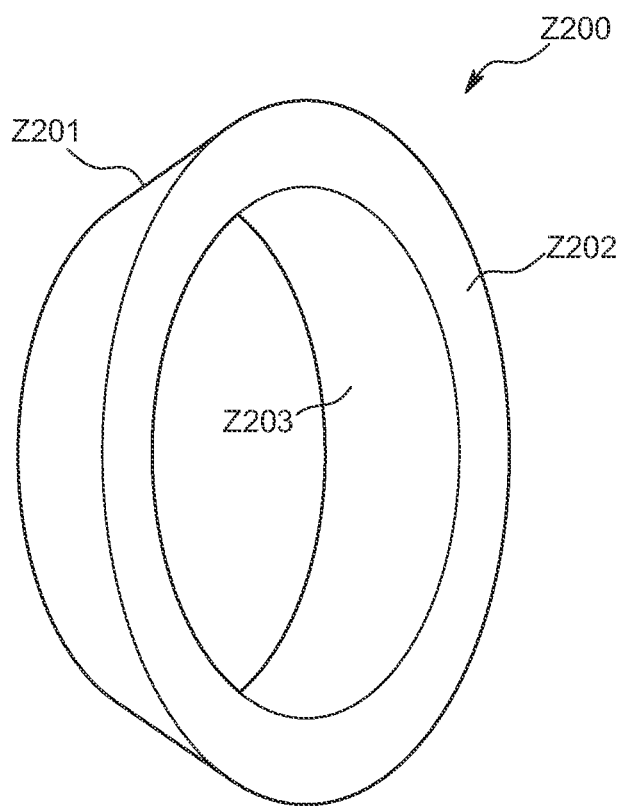
FIG. 12 is an overall perspective view of an inclined ring according to a fifth embodiment of the present invention.
Figure 13:
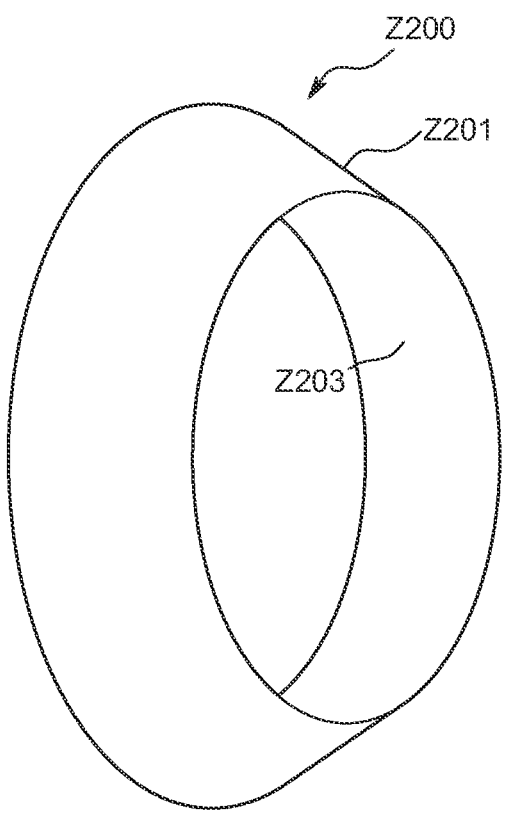
FIG. 13 is an overall perspective view of the inclined ring viewed from a different side according to the fifth embodiment.

The inclined ring Z200 is intended to make it possible to use the inclined-surface flange joint for each of the existing flanges Z2a and Z2b without inclined surfaces. The inclined ring Z200 includes a base surface Z202, an inner circumferential surface Z203, and an inclined surface Z201 as shown in FIGS. 12, 13, and the like.

The base surface Z202 is in the form of a circular ring plate, and has inside and outside diameters identical to inside and outside diameters of each of the rear surfaces Z3a and Z3b of the flanges Z2a and Z2b, respectively.

The inner circumferential surface Z203 is in the form of a cylinder upright from the inside diameter of the base surface Z202.

The inclined surface Z201 is made wider outward from a tip end of the inner circumferential surface Z203 toward each of the flanges Z2a and Z2b when the inclined ring Z200 is attached to each of rear surfaces Z3a and Z3b of the flanges Z2a and Z2b, and is in the form corresponding to that of the inclined sidewall Z51 a of the coupling ring Z100. In this embodiment, the inclined surface Z201 has an inclination angle corresponding to that of the inclined sidewall Z51a.

A method of coupling the pipes Z1a and Z1b in series and separating the pipes Z1a and Z1b using the inclined ring Z200 according to this embodiment will next be described.

First, two inclined rings Z200 are fitted into the pipes Z1a and Z1b so that the base surfaces Z202 are closely attached onto the rear surfaces Z3a and Z3b of the flanges Z2a and Z2b, respectively. Next, one end portion of the positioning ring Z8 is externally fitted into the stepped portion Z4a of one pipe Z1a, and the gasket Z7 and the other stepped portion Z4b are sequentially fitted into the other end portion of the positioning ring Z8. It is thereby possible to precisely coincide central axes of the pipes Z1a and Z1b and the gasket Z7.

The concave groove Z51 of the coupling ring Z100 in an open state in which the both ends are not coupled is externally fitted into each of outer circumferences of the opposing flanges Z2a and Z2b. If the fastener Z52 is fastened to make the inner circumferential diameter of the coupling ring Z100 smaller, the inclined sidewall Z51a formed on the side surface of the concave groove Z51 radially presses each of the inclined surfaces Z201 of the inclined rings Z200 as shown in FIG. 15. Axial components of force generated at that time press the flanges Z2a and Z2b against each other, the protrusions Z5a and Z5b enter into both surfaces of the gasket Z7, and the pipes Z1a and Z1b are connected to each other with airtightness kept sufficiently.

With such a configuration, the coupling ring Z100 can be used even for the flanges Z2a and Z2b without inclined surfaces only by attaching the inclined rings Z200 quite simple in form to rear sides of the opposing surfaces of the respective flanges Z2a and Z2b. Furthermore, since the inclined rings Z200 have the inner circumferential surfaces Z203 closely attached onto outer circumferential surfaces of the respective pipe main bodies Z11a and Z11b, it is possible to further ensure pressure-bonding the flanges Z2a and Z2b to each other.

Additionally, a fluid supply device can be configured using the flange joint Z300 according to this embodiment. For example, the fluid supply device is configured to include gas supply lines ZL1 that are three longitudinal fluid lines provided in parallel, and one horizontal fluid line that is provided among these gas supply lines ZL1 and that is a cleaning gas supply line ZL2, in this embodiment, supplying cleaning gas to the respective gas supply lines ZL1.

Each of the longitudinal fluid lines ZL1 includes a fluid device such as a mass flow controller ZX11 or the like and is configured to function as a gas supply line. The horizontal fluid line ZL2 is configured to function as the cleaning gas supply line. While it is described herein that the flange joint Z300 is used for each of all pipe connections, the present invention is not limited to this example. It suffices to use the flange joint Z300 for at least one pipe connection.

Figure 16:
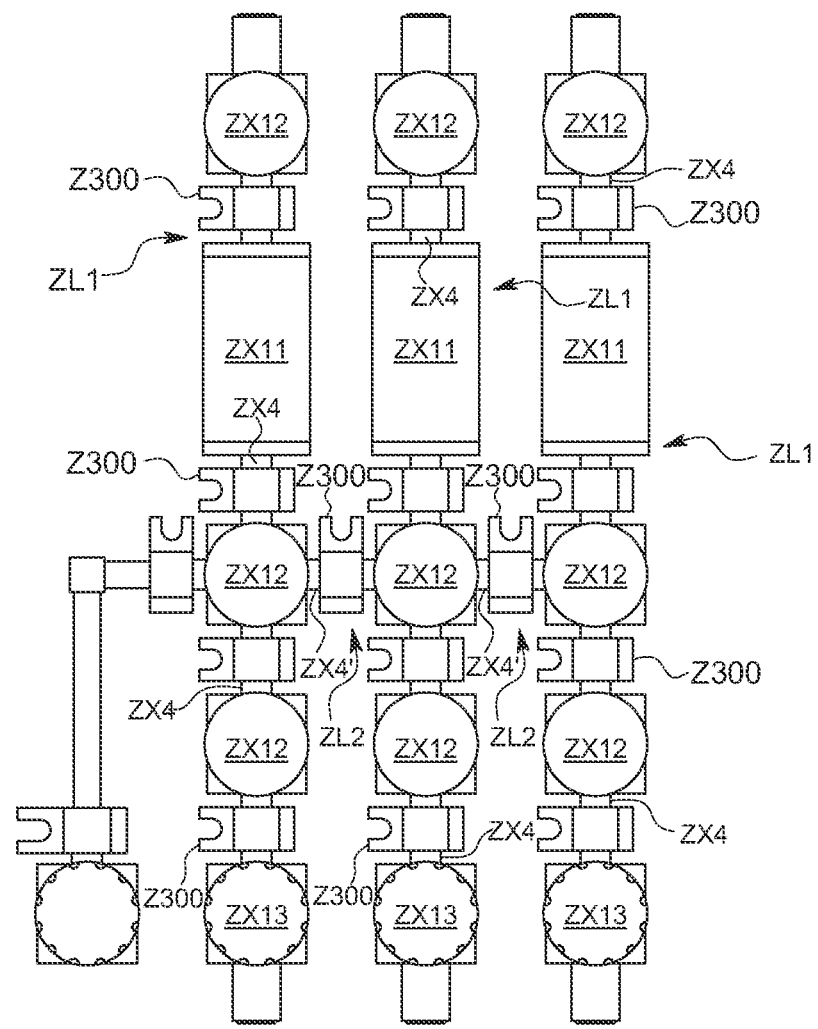
FIG. 16 is a configuration diagram of a fluid supply device using the coupling ring according to the fifth embodiment.

In FIG. 16, reference symbol ZL1 denotes the gas supply line, ZL2 denotes the cleaning gas supply line, ZX11 denotes the mass flow controller, ZX12 and ZX13 denote valves or pressure sensors, Z300 denotes the flange joint, and ZX4 and ZX4' denote piping.

Figure 17:
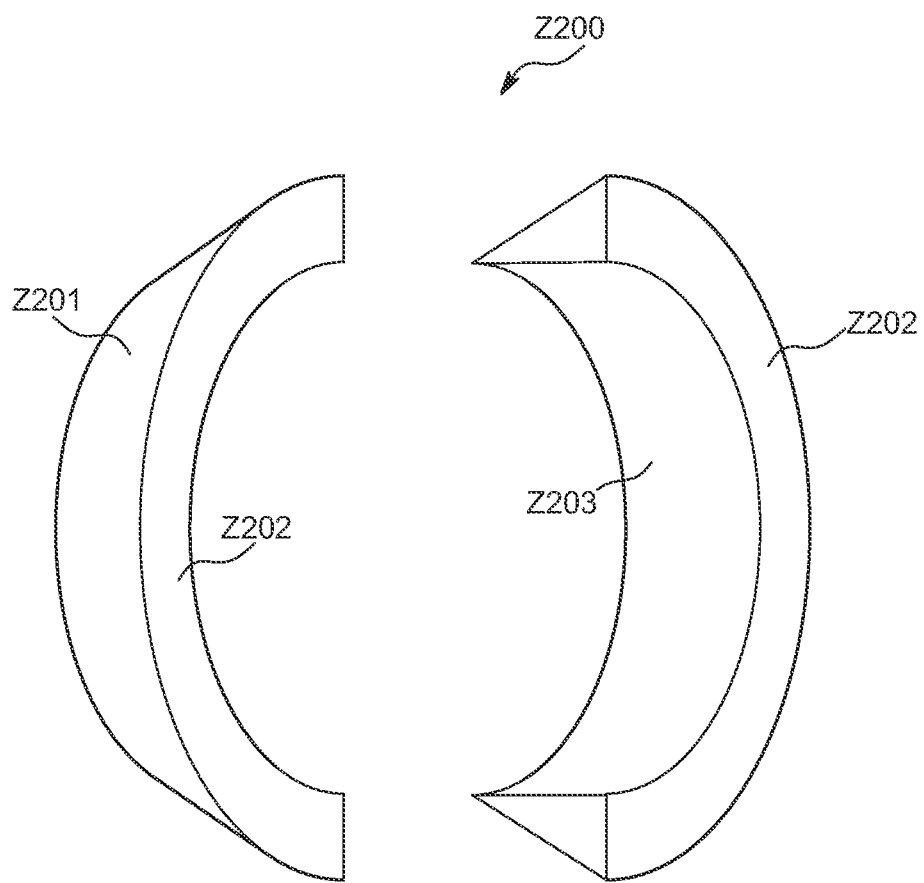
FIG. 17 is an overall perspective view of an inclined ring according to another aspect of the present invention.

The present invention is not limited to this embodiment. For example, as shown in FIG. 17, the inclined rings can be attached from the radial direction if the inclined rings are formed out of a plurality of divided pieces in the form obtained by radially dividing a circular ring. Due to this, the inclined rings can be easily attached to the pipes to which it is difficult to attach the inclined rings from the axial direction for such a reason that the pipes are connected vertically and horizontally or that each of the pipes includes members on both ends.

Alternatively, a retracted surface in the form of a convex can be formed on the base surface so that the base surface is not closely attached to a protrusion such as the fastener formed on the rear surface of each flange. By so configuring, the same type of inclined rings can be used for a plurality of flanges or the like different in the shape of a partial part of the rear surface.

Various changes and modifications can be made of the present invention without departure of the spirit of the present invention.

REFERENCE CHARACTERS LIST 1a, 1b . . . Pipe
2a, 2b . . . Flange
3a, 3b . . . Inclined surface formed on rear surface of flange
4a, 4b . . . Stepped portion
5a, 5b . . . Protrusion
7 . . . Gasket
8 . . . Positioning ring
11a, 11b . . . Pipe main body
50a, 50b, 50c . . . Unit member
51 . . . Concave groove
51a . . . Inclined surface formed on side surface of concave groove
52 . . . Fastener
52a . . . Bolt member
52b . . . Nut member
53a, 53b . . . Shaft
54 . . . Notch
60a, 60b . . . Stopper member
100 . . . Coupling ring
300 . . . Flange joint
Y1a, Y1b . . . Pipe
Y2a, Y2b . . . Flange
Y3a, Y3b . . . Inclined surface formed on rear surface of flange
Y4a, Y4b . . . Stepped portion
Y5a, Y5b . . . Protrusion
Y7 . . . Gasket
Y11a, Y11b . . . Pipe main body
Y50a, Y50b, Y50c . . . Unit member
Y51 . . . Concave groove
Y51a . . . Inclined surface formed on rear surface of concave groove
Y52 . . . Fastener
Y52a . . . Bolt member
Y52b . . . Nut member
Y53a, Y53b . . . Shaft
Y54 . . . Bolt inlet
Y100 . . . Coupling ring
Y200 . . . Positioning ring
Y201 . . . Holder
Y201a . . . Cut
Y202a, Y202b . . . Notch
Y203 . . . Residual portion
Y300 . . . Flange joint
Z1a, Z1b . . . Pipe
Z2a, Z2b . . . Flange
Z3a, Z3b . . . Rear surface
Z4a, Z4b . . . Stepped portion
Z5a, Z5b . . . Protrusion
Z7 . . . Gasket
Z8 . . . Positioning ring
Z11a, Z11b . . . Pipe main body
Z50a, Z50b, Z50c . . . Unit member
Z51 . . . Concave groove
Z51a . . . Inclined sidewall
Z52 . . . Fastener
Z52a . . . Bolt member
Z52b . . . Nut member
Z53a, Z53b . . . Shaft
Z54 . . . Notch
Z100 . . . Coupling ring
Z200 . . . Inclined ring
Z201 . . . Inclined surface
Z202 . . . Base surface
Z203 Inner circumferential surface

The invention claimed is:
1. A coupling ring, comprising:
a series of unit members configured so that the unit members adjacent to each other are rotatably coupled to each other; and a fastener coupling unit members on both ends of the coupling ring, wherein a concave groove extending circumferentially is externally fitted onto an outer circumference of each of two opposing flanges, the unit members on both ends are coupled to each other by the fastener when the coupling ring is in an annular state, the fastener presses an inclined surface formed on a side surface of the concave groove and inclined surfaces formed on rear surfaces of the respective flanges together, and the series of unit members includes three unit members, and a stopper member is provided on the unit members on both ends to restrict a separation angle between the unit members on both ends and an intermediate unit member located intermediate the unit members on both ends to fall within a certain angle in an open state in which the unit members on the both ends are not coupled to each other by the fastener, and a flat surface of the stopper member abuts a flat surface of the intermediate unit member, and the stopper member is provided on an outer periphery of the unit members on both ends and protrudes outwards from the intermediate unit member when viewed from a rotating axis direction of the unit members on both ends in a state that the unit members on both ends are closed.

2. The coupling ring according to claim 1, wherein the certain angle is equal to or smaller than 180 degrees.

3. A fluid supply device, comprising:

a coupling ring, including:

a series of unit members configured so that the unit members adjacent to each other are rotatably coupled to each other; and a fastener coupling unit members on both ends of the coupling ring, wherein a concave groove extending extend circumferentially is externally fitted onto an outer circumference of each of two opposing flanges, the unit members on both ends are coupled to each other by the fastener when the coupling ring is in an annular state, the fastener presses an inclined surface formed on a side surface of the concave groove and inclined surfaces formed on rear surfaces of the respective flanges together, and the series of unit members includes three unit members, and a stopper member is provided on the unit members on both ends to restrict a separation angle between the unit members on both ends and an intermediate unit member located intermediate the unit members on both ends to fall within a certain angle in an open state in which the unit members on the both ends are not coupled to each other by the fastener, and a flat surface of the stopper member abuts a flat surface of the intermediate unit member, and the stopper member is provided on an outer periphery of the unit members on both ends and protrudes outwards from the intermediate unit member when viewed from a rotating axis direction of the unit members on both ends in a state that the unit members on both ends are closed.

\* \* \* \* \*